C. A. PERSONS.
SADDLE.
APPLICATION FILED MAY 25, 1908.
959,591.
Patented May 31, 1910.
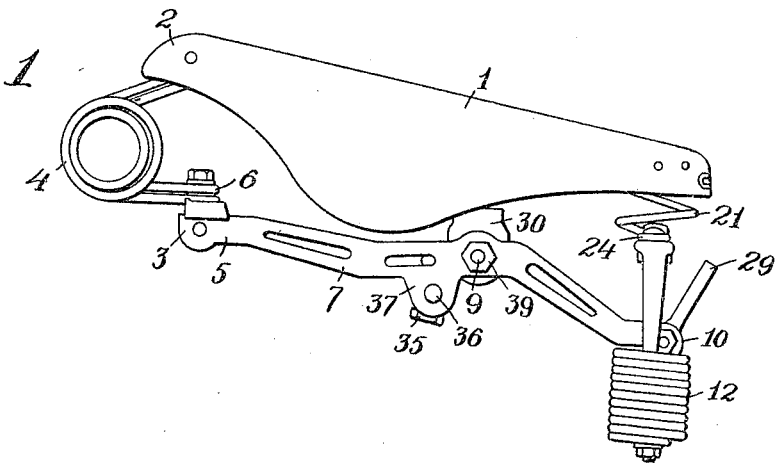
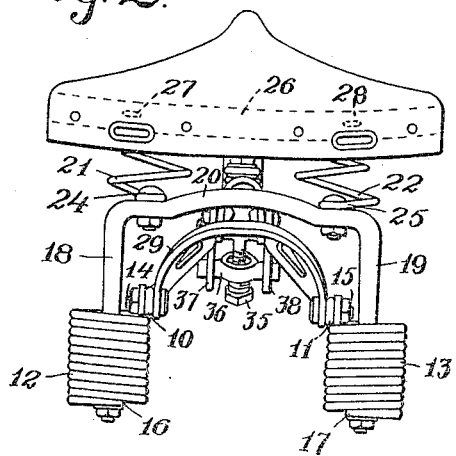
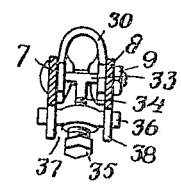
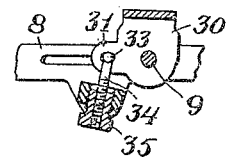
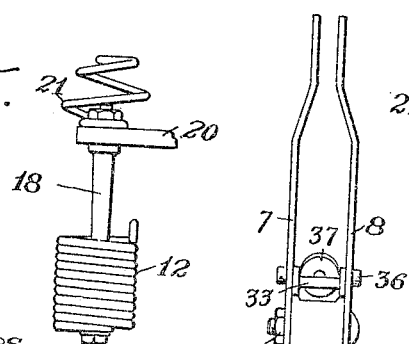
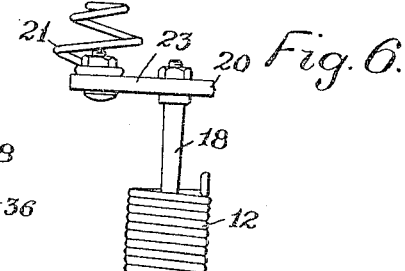
Witnesses
R. D. Tolman
A. N. Neilson
Inventor
Charles A. Persons.
By H. W. Bartlett
Attorney

UNITED STATES PATENT OFFICE.

CHARLES A. PERSONS, OF WORCESTER, MASSACHUSETTS.

SADDLE.

959,591.      Specification of Letters Patent.      Patented May 31, 1910.

Application filed May 25, 1908. Serial No. 434,911.

*To all whom it may concern:*

Be it known that I, CHARLES A. PERSONS, a citizen of the United States, residing at Worcester, in the county of Worcester, State of Massachusetts, have invented a certain new and useful Improvement in Saddles, of which the following is a specification, reference being had therein to the accompanying drawings.

This invention relates to resilient seats or saddles, but more particularly to such as are used on velocipedes, bicycles or other vehicles.

For simplicity and clearness in the following description, the device will be treated in connection with bicycle saddles, but it should be clearly understood that it may be applied to any seat or saddle.

One of the objects of this invention is to provide a saddle having the highest vibration absorption, and whose efficiency is uneffected by the tilting of the same from its horizontal position.

In the ordinary form of bicycle saddle, the springs consist of one or more sections of spring wire running from front to rear and passing through a clamp. The introduction of the motor cycle and the demand for greater comfort in riding has led to the introduction of compound spring seats. These generally comprise a single or double loop of spring wire at the front or peak of the saddle, and a pair of compound springs, each consisting of a compression and an extension spring, to support the cantle. Heretofore these compound springs have been arranged concentrically with the compression spring within the extension spring to allow the use of comparatively long springs without danger of buckling. Such a form would probably operate satisfactorily in a fixed horizontal saddle, but when the latter is tilted, the compression spring chafes on the extension spring.

The applicant has devised a compound coil spring in which the compression and the extension springs do not act within one another, but which will not buckle.

One form of this device consists of a pair of extension springs suspended from the arms of a truss having upright rods or posts attached to the ends of these springs to support the compression springs, and a support or bridge connecting these posts.

It should be clearly understood that the applicant does not limit his invention to this construction and arrangement of parts, as they may be materially varied without effecting the result.

It is generally advisable to construct the extension spring a little stronger than the compression spring or vice versa, to procure the dash pot or damping effect, although this is not essential.

To allow the saddle to be tilted to a convenient angle, an adjustable clamp may be fastened to the truss to attach the saddle to the saddle post. Heretofore numerous forms of clamps have been devised, but these usually allow tilting, if at all, by merely loosening the clamping bolt and tilting the saddle.

One form of the applicant's device shows an adjusting screw by means of which the saddle may be moved to any convenient angle and held there in absolute safety, as will be more fully shown and described hereinafter. This clamp thus contains an adjusting screw, also serving as a means for preventing accidental revolution of the saddle on the clamping bolt.

One embodiment of the invention is shown in the accompanying drawings in which:—

Figure 1, is a side view of the invention complete. Fig. 2, rear view of same. Fig. 3, front view of clamp, to be described hereinafter. Fig. 4, side view of same, portions removed to show adjusting screw. Fig. 5, modification of compound spring. Fig. 6, modification of compound spring. Fig. 7, truss detached from saddle, to be described hereinafter.

In the drawings, the seat 1 is attached at its peak 2 to the spring 3, having a double loop at 4, the other extremity of the spring 3 being fastened to the frame 5 at 6.

The frame is shown as composed of two trusses 7 and 8, as shown in Fig. 7, and these are fastened together by the clamp bolt 9 at approximately their center. At the extremities 10 and 11 of the trusses 7 and 8 respectively, are suspended the extension coil springs 12 and 13, the upper ends of the same being clamped to the trusses by the bolts 14 and 15 respectively. At the lower or free ends 16 and 17 of the springs 12 and 13 respectively, are attached upright rods or posts 18 and 19 extending upward within the coils. These posts may be any convenient lengths, but it is generally advantageous to make them sufficiently long to normally maintain the support or bridge 20 at sufficient height that the latter may not come in contact with the top of the extension springs 12 and 13 when the saddle is in use.

The posts 18 and 19 and the bridge 20 are shown in one piece in Figs. 1 and 2, but these may be separate parts as shown in Figs. 5 and 6. In Fig. 5, the bridge is bolted to the upper extremities of the posts 18 and 19 by extending these posts through apertures in the bridge, and threading the ends of the posts to allow nuts to be placed thereon.

Fig. 6, shows an advantageous modification of the bridge 20 where a wide seat is to be used. The rod is extended beyond the junction of the posts and itself to form projecting arms 23 to support the compression springs, described hereinafter.

The compression coil springs 21 and 22 are attached at their lower ends 24 and 25 to the bridge 20 at or near its extremities, and the upper ends of these springs 21 and 22 are attached to the cantle 26 at 27 and 28 by bolts or other suitable means.

To support the rear extremities 10 and 11 of the trusses 7 and 8 respectively, a brace 29 is placed between them, as shown in Figs. 1 and 2. This brace is preferably curved to allow the saddle post of a bicycle to pass beneath and thus permit the saddle to be tilted. Care should be taken that this does not extend upward or inward sufficiently to interfere with the action of the seat.

Upon the clamping bolt 9 is a collar 30 to grasp the saddle post when the saddle is placed upon the bicycle. The tightening of the clamping bolt contracts this collar, when the saddle is upon the post, and prevents side revolution or tilting. The collar is provided with ears 31 and 32 having apertures to contain a pin 33 connecting these ears. To this pin 33 is fastened the adjusting screw 34 which is threaded to mesh with a tapped hole in the hexagonal headed screw 35, the latter being threaded also on its outer surface to mesh with a tapped hole in the pin 36, connecting ears 37 and 38 on the trusses 7 and 8 respectively. The hexagonal headed screw 35 is preferably threaded right on its inner wall and left on its outer wall which prevents accidental movement of the adjusting screw and also causes the latter to advance a considerable amount on a slight turn of the former. To operate this clamp, the nut 39 on the clamping bolt 9 should be loosened, the hexagonal screw turned to tilt the saddle in the proper direction, and the nut 39 tightened when the saddle is in place.

It should be clearly understood that the invention is not limited to this construction and arrangement of parts in the clamping device, as the same might be greatly altered without changing the principles thereof.

What I claim as my invention and desire to secure by Letters Patent is:—

1. In a device of the class described, a seat, a supporting frame, means for resiliently connecting the peak of the seat with the supporting frame, a cantle under the rear portion of said seat, downwardly extending resilient members attached to under side of the cantle, downwardly extending resilient members attached to the rear of the supporting frame, means for rigidly connecting the lower ends of the frame supported members with the lower ends of the corresponding cantle supported members, and means for bracing these connecting means.

2. In a device of the class described, a seat, a supporting frame, means for resiliently connecting the peak of the seat with the supporting frame, a cantle under the rear portion of said seat, downwardly extending compressible springs attached to the under side of the cantle, downwardly extending extensible springs attached to the rear of the supporting frame, means for rigidly connecting the lower ends of the extension springs with the lower ends of the corresponding compression springs, and means for bracing these connecting members.

3. In a device of the class described, a seat a supporting frame, means for resiliently connecting the peak of the saddle with the supporting frame, a cantle under the rear portion of said seat, downwardly extending compressible springs attached to the cantle, downwardly extending extensible springs attached to the rear of the supporting frame, rods connecting the lower ends of the extensible springs with the lower ends of the corresponding compressible springs, and means for bracing these connecting rods.

4. In a device of the class described, a seat, a supporting frame, means for resiliently connecting the peak of the seat with the supporting frame, a cantle under the rear portion of said seat, downwardly extending compressible springs attached to the under side of the cantle, downwardly extending extensible springs attached to the rear of the supporting frame, rods connecting the lower ends of the extensible springs with the lower ends of the corresponding compressible springs, and a bridge joining these connecting rods.

5. In a device of the class described, a seat a supporting frame, means for resiliently connecting the peak of the seat with the supporting frame, a cantle under the rear portion of said seat, downwardly extending compressible coil springs attached to the under side of the cantle, downwardly extending extensible coil springs attached to the rear of the supporting frame, rods connecting the lower ends of the extensible coil springs with the lower ends of the corresponding compressible coil springs, said rods passing within the coil of said extensible coil springs, and bracing means for said connecting rods.

In testimony whereof I affix my signature in presence of two witnesses.

CHARLES A. PERSONS.

Witnesses:
HARTLEY W. BARTLETT,
A. H. NEILSON.